(12) United States Patent
Kawano et al.

(10) Patent No.: US 11,429,643 B2
(45) Date of Patent: Aug. 30, 2022

(54) INFORMATION COLLECTION APPARATUS, METHOD OF CONTROLLING INFORMATION COLLECTION APPARATUS, AND NON-TRANSITORY RECORDING MEDIUM RECORDING PROGRAM

(71) Applicant: SEIKO EPSON CORPORATION, Tokyo (JP)

(72) Inventors: Keiro Kawano, Matsumoto (JP); Kaoru Takemae, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 16/712,788

(22) Filed: Dec. 12, 2019

(65) Prior Publication Data

US 2020/0192917 A1    Jun. 18, 2020

(30) Foreign Application Priority Data

Dec. 13, 2018  (JP) .............................. JP2018-233818

(51) Int. Cl.
*G06F 16/28* (2019.01)
*G06F 3/12* (2006.01)

(52) U.S. Cl.
CPC .......... *G06F 16/285* (2019.01); *G06F 3/1219* (2013.01); *G06F 3/1259* (2013.01); *G06F 3/1273* (2013.01); *G06F 3/1289* (2013.01); *Y02D 10/00* (2018.01)

(58) Field of Classification Search
None
See application file for complete search history.

(56) References Cited

U.S. PATENT DOCUMENTS

2006/0043166 A1    3/2006  Matsumoto et al.
2019/0346801 A1*   11/2019 Miyazawa ........... G03G 15/556

FOREIGN PATENT DOCUMENTS

JP         2006-065432         3/2006

* cited by examiner

*Primary Examiner* — Fan Zhang
(74) *Attorney, Agent, or Firm* — Workman Nydegger

(57) ABSTRACT

A information collection apparatus for collecting information indicating a state of a printer, the PC configured to perform processing including: collecting a first group of the information; and referring to a collection condition table associating the first group of the information, a first condition, and a second group of the information, wherein when the collected first group of the information satisfies the associated first condition, a determination is made to collect the associated second group of the information, whereas when the collected first group of the information does not satisfy the associated first condition, a determination is made not to collect the associated second group of the information.

8 Claims, 10 Drawing Sheets

FIG. 7

| FIRST GROUP OF INFORMATION | FIRST CONDITION | SECOND GROUP OF INFORMATION | SECOND CONDITION | THIRD GROUP OF INFORMATION |
|---|---|---|---|---|
| CARTRIDGE SERIAL NUMBER | CHANGE | THE NUMBER OF TIMES OF CARTRIDGE REPLACEMENT | — | — |
| | | CARTRIDGE MODEL NUMBER | CHANGE | CARTRIDGE COLOR INFORMATION |
| | | | | CARTRIDGE CAPACITY |
| INK REMAINING AMOUNT | INCREASE | THE NUMBER OF TIMES OF CARTRIDGE REPLACEMENT | — | — |
| | | CARTRIDGE MODEL NUMBER | CHANGE | CARTRIDGE COLOR INFORMATION |
| | | | | CARTRIDGE CAPACITY |
| ELAPSED TIME AFTER START | ELAPSED TIME AFTER START < ELAPSED TIME FROM THE LAST INFORMATION COLLECTION TIME | THE NUMBER OF PAPER CASSETTES | — | — |
| | | EXISTENCE OF DOUBLE-SIDE PRINTING UNIT | — | — |

INFORMATION COLLECTION APPARATUS, METHOD OF CONTROLLING INFORMATION COLLECTION APPARATUS, AND NON-TRANSITORY RECORDING MEDIUM RECORDING PROGRAM

The present application is based on, and claims priority from JP Application Serial Number 2018-233818, filed Dec. 13, 2018, the disclosure of which is hereby incorporated by reference herein in its entirety.

BACKGROUND

1. Technical Field

The present disclosure relates to an information collection apparatus that collects information on a printer, a method of controlling an information collection apparatus, and a non-transitory recording medium recording a program.

2. Related Art

To date, as disclosed in JP-A-2006-065432, an information collection apparatus is known that collects a plurality of pieces of information from a printer at collection intervals set in a setting file.

In the related-art information collection apparatus, a collection interval is set in advance. Accordingly, for example, when there is a dependency relationship in which a second group of information is not changed unless a first group of information is changed, both the first group of information and the second group of information are collected every time. In this manner, the second group of information that is unnecessary to collect every time is regularly collected so that problems, such as network congestion between an information collection apparatus and a printer, and useless power consumption of the information collection apparatus, and the like occur.

SUMMARY

According to an aspect of the present disclosure, there is provided an information collection apparatus for collecting information indicating a state of a printer, the information collection apparatus including: a controller configured to collect a first group of the information and refer to a collection condition table associating the first group of the information, a first condition, and a second group of the information, wherein when the collected first group of the information satisfies the associated first condition, the controller determines to collect the associated second group of the information, whereas when the collected first group of the information does not satisfy the associated first condition, the controller determines not to collect the associated second group of the information.

According to another aspect of the present disclosure, there is provided a method of controlling an information collection apparatus for collecting information indicating a state of a printer, the method including: collecting a first group of the information; and referring to a collection condition table associating the first group of the information, a first condition, and second a group of the information, wherein when the collected first group of the information satisfies the associated first condition, determining to collect the associated second group of the information, whereas when the collected first group of the information does not satisfy the associated first condition, determining not to collect the associated second group of the information.

According to another aspect of the present disclosure, there is provided a non-transitory recording medium recording a program that causes a controller of an information collection apparatus for collecting information indicating a state of a printer to perform processing, the processing including: collecting a first group of the information; and referring to a collection condition table associating the first group of the information, a first condition, and a second group of the information, wherein when the collected first group of the information satisfies the associated first condition, determining to collect the associated second group of the information, whereas when the collected first group of the information does not satisfy the associated first condition, determining not to collect the associated second group of the information.

BRIEF DESCRIPTION OF THE DRAWINGS

FIG. 7 is a diagram illustrating an example of a collection condition table according to a second embodiment.

DESCRIPTION OF EXEMPLARY EMBODIMENTS

First Embodiment

Figure 1:
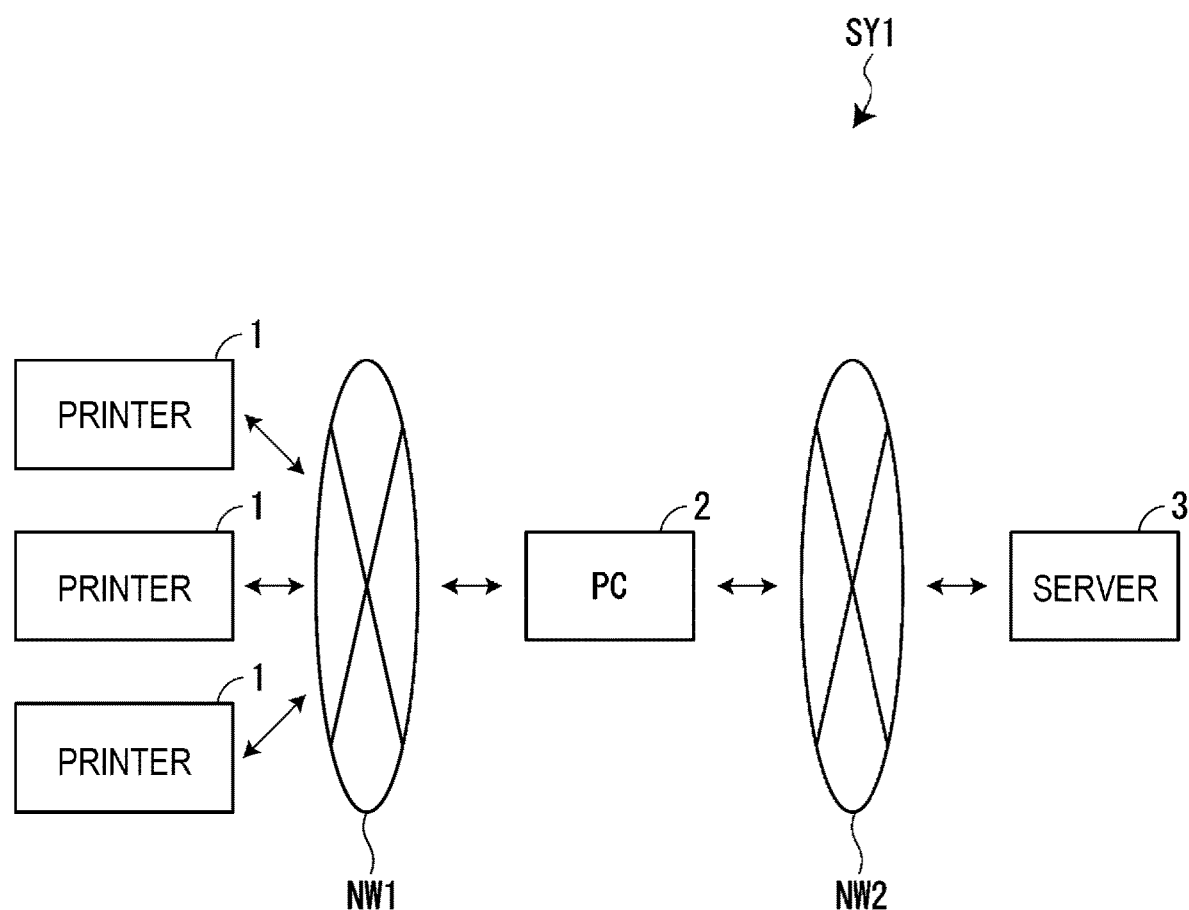
FIG. 1 is a system configuration diagram of an information collection system.

In the following, a description will be given of an information collection apparatus according to an embodiment, a method of controlling an information collection apparatus, and a program with reference to the accompanying drawings. FIG. 1 is the system configuration diagram of an information collection system SY1 according to a first embodiment. The information collection system SY1 includes one or more printers 1, a PC (personal computer) 2, and a server 3. The printer 1 is an example of the "printer", and the PC 2 is an example of the "information collection apparatus".

As an installation example of the information collection system SY1, it is thought that an information management company that provides information management services of the printer 1 operates and manages the server 3, and installs the PC 2 at a customer that receives the information management services. The PC 2 collects information of the printer 1 used by the customer and transmits the collected information to the server 3.

The printer 1 and the PC 2 are connected via a first network NW1. The first network NW1 is, for example, a LAN (local area network). Also, the PC 2 and the server 3 are connected via a second network NW2. The second network NW2 is, for example, the Internet communication network. In this regard, the first network NW1 and the second network NW2 may be a common network.

The PC 2 gives a print instruction to the printer 1 and collects information indicating the state of the printer 1 from the printer 1. For the information indicating the state of the printer 1, for example, device information, consumables information, and operation information, and the like are considered. The device information includes, for example, information regarding the hardware configuration and the software configuration of the printer 1, status information, such as an operation log, errors, warnings, and the like, various setting values, and the like. Also, the consumables information includes colorant information on the colorant used by the printer 1, print medium information on the print medium used by the printer 1, accounting information on the printer 1 in accordance with a use result of the consumables, such as a colorant, a print medium, and the like. Further, when the printer 1 is an ink jet printer, the colorant information includes information on an ink cartridge. Also, when the print medium is copy paper, the print medium information includes information on a paper cassette. On the other hand, the operation information includes an operation log, which is a history of user operations, and the like.

The PC 2 transmits the information collected from each printer 1 to the server 3. The server 3 stores the information transmitted from the PC 2 in a database and manages the information. The server 3 gives instructions of maintenance and inspection on the printer 1, creates delivery plans of the consumables, charges in accordance with the consumption amount of the consumables, and the like using the information stored in the database.

Figure 2:
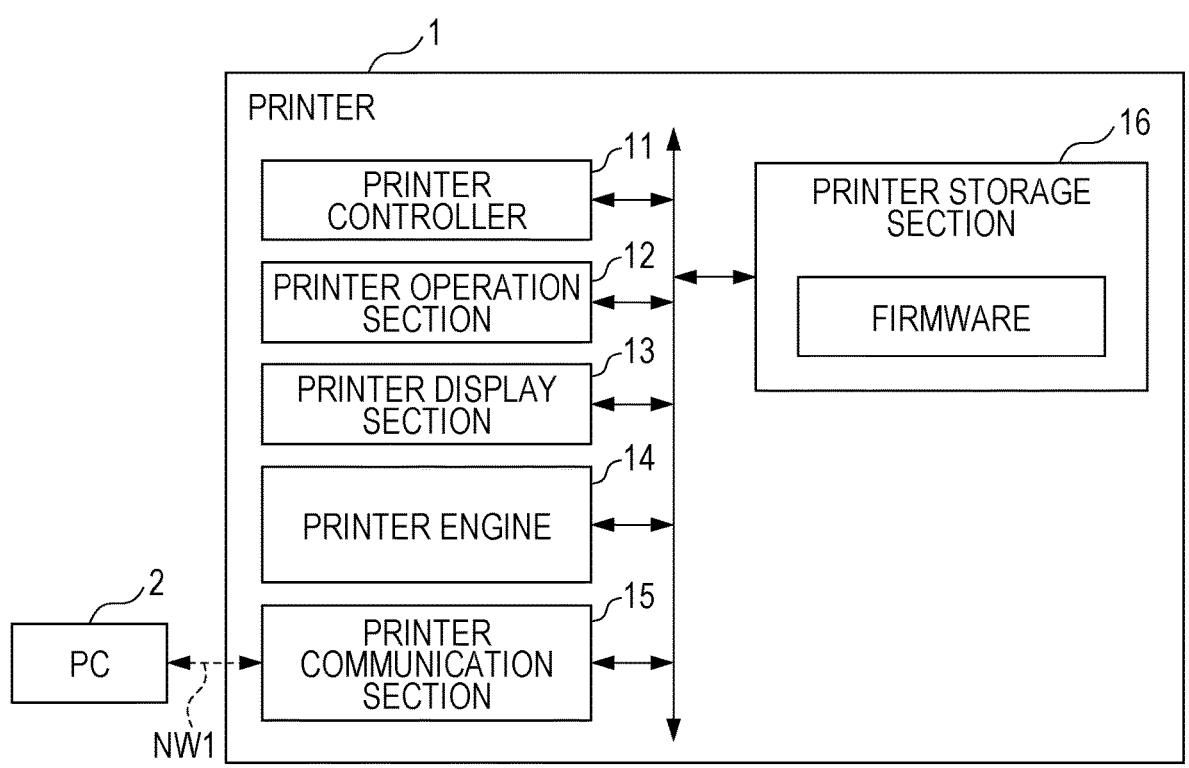
FIG. 2 is a block diagram illustrating the hardware configuration of a printer.

FIG. 2 is a block diagram illustrating the hardware configuration of the printer 1. The printer 1 includes a printer controller 11, a printer operation section 12, a printer display section 13, a printer engine 14, a printer communication section 15, and a printer storage section 16. The printing type of the printer 1 is not particularly limited. For example, an ink jet type, an electrophotographic type, a thermal transfer type, a thermal type, and the like are considered.

The printer controller 11 includes a ROM (read only memory), a RAM (random access memory), and the like, in addition to a processor, such as a CPU (central processing unit), and the like, and controls each section in the printer 1. The printer operation section 12 is used by a user for performing various operations on the printer 1. The printer display section 13 displays various kinds of information, such as the device configuration of the printer 1, consumables information, operation information, and the like.

The printer engine 14 is a print mechanism that perform printing on a print medium, such as copy paper, or the like. For example, when the printer 1 is an ink jet printer, the printer engine 14 includes an ink jet head, a head drive mechanism, a print medium transport mechanism, and the like. The printer communication section 15 performs communication with the PC 2 via the first network NW1.

The printer storage section 16 is, for example, a flash memory and stores firmware, and the like. The firmware is a control program for controlling the printer 1. The printer controller 11 performs communication control with the PC 2 and print control of the printer engine 14 based on the firmware. Also, the printer controller 11 detects information indicating the state of the printer 1 based on the firmware.

In this regard, the printer controller 11 may detect the information based on an information request from the PC 2, or may detect the information regularly and temporarily store the detected information in the RAM, or the like. In the latter case, the printer controller 11 reads the information from the RAM, or the like in response to an information request from the PC 2 and provides the PC 2 with the read information.

Figure 3:
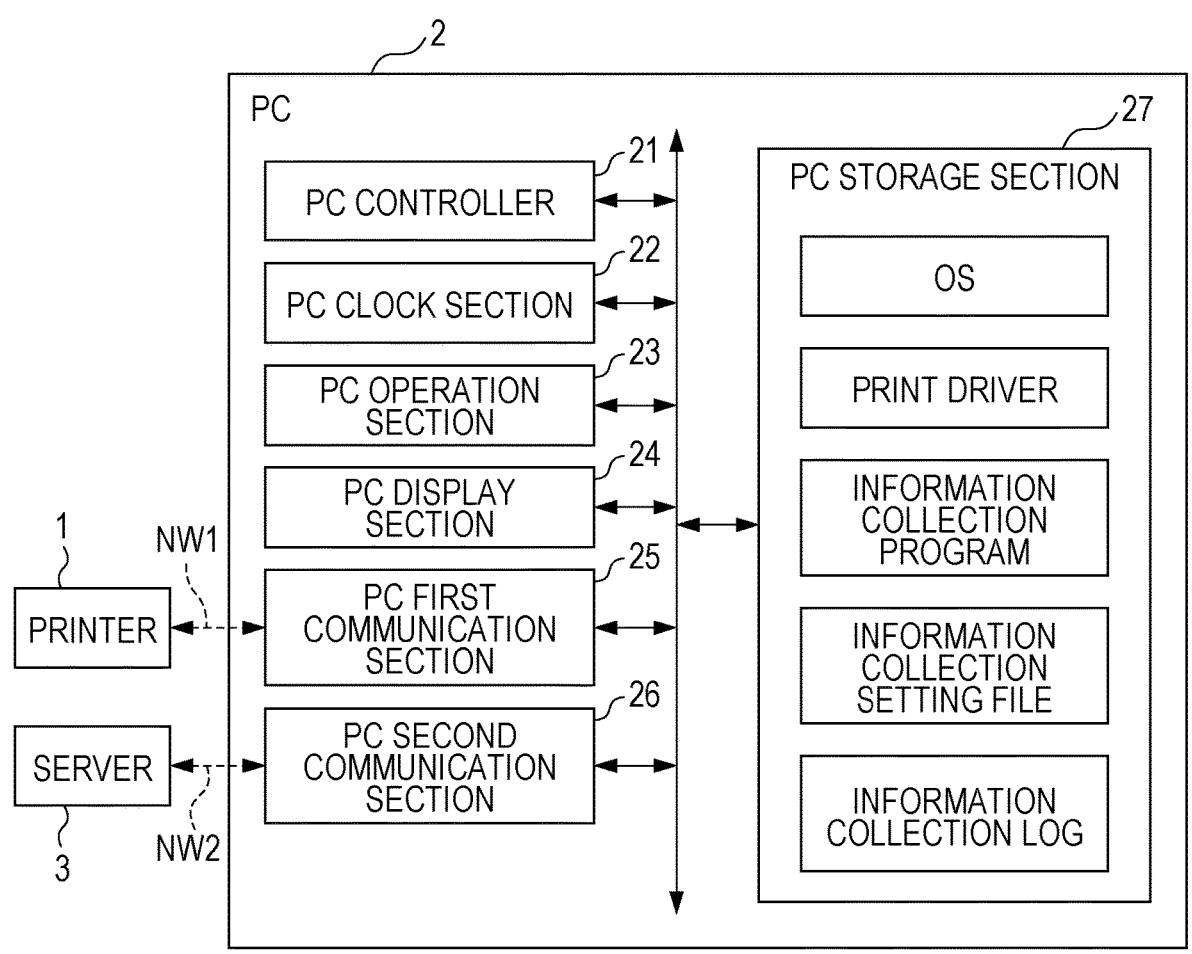
FIG. 3 is a block diagram illustrating the hardware configuration of a PC.

FIG. 3 is a block diagram illustrating the hardware configuration of the PC 2. The PC 2 includes a PC controller 21, a PC clock section 22, a PC operation section 23, a PC display section 24, a PC first communication section 25, a PC second communication section 26, and a PC storage section 27. In this regard, the PC controller 21 is an example of the "controller".

The PC controller 21 includes a processor, such as a CPU, or the like, a ROM, a RAM, and the like and controls each section in the PC 2. The PC clock section 22 measures a time interval for collecting information in order to determine a collection timing for collecting information from the printer 1. In this regard, the collection timing refers to a start timing of a communication session for collecting information. In the present embodiment, it is assumed that the PC controller 21 starts communication sessions at regular time intervals. Also, the PC clock section 22 counts the current time in order to record information collection time as an information collection log.

The PC operation section 23 is, for example, a keyboard or a mouse and is used by a user in order to perform various operations, such as giving a print instruction to the printer 1, making various settings on information collection, and the like. The PC display section 24 is, for example, a liquid crystal display, and displays various kinds of information, such as print data, information collected from the printer 1, and the like. The PC first communication section 25 performs communication with the printer 1 via the first network NW1. The PC second communication section 26 performs communication with the server 3 via the second network NW2.

The PC storage section 27 is, for example, an HDD (hard disk drive) and stores an OS (operating system), a print driver, an information collection program, an information collection setting file, an information collection log, and the like. The information collection program is an example of the "program". The OS is basic software for executing an application program, such as an information collection program, and the like. The print driver is a control program for performing print control of the printer 1, such as generating print data in a command system, which is readable by the printer 1, and the like. The information collection program is an agent program that collects information from the printer 1 and transmits the collected information to the server 3. The PC controller 21 performs control, such as changing the collection frequency of information, narrowing down the collection information, and the like based on the information collection program. The details thereof will be described later.

On the other hand, the information collection setting file is a file in which items of information to be collected are set. In the present embodiment, an information threshold value table in which items of information to be collected and the threshold values thereof are set is stored as an information collection setting file. Here, the "items" refer to a "cartridge serial number", an "ink remaining amount", and the like. Also, the "information" refers to, for example, "CA1234", and the like for the item "cartridge serial number", and "large", "100 ml", and the like for the item "ink remaining amount". The PC controller 21 collects the information on the items set in the information collection setting file from the printer 1. On the other hand, the "threshold value" is a value to be a determination criterion as to whether or not the information of the corresponding item is to be collected. In this regard, the information collection setting file is displayed on the PC display section 24 and is editable by the operation of the PC operation section 23. Also, the information collection setting file may not necessarily be stored in the PC 2 and may be stored in an external device capable of communicating with the PC 2.

The information collection log is the information in which information collected from the printer 1 and information collection time are recorded in association with each other. In this regard, when the PC 2 collects information on a plurality of printers 1, the information collection setting file and the information collection log are set or recorded for each printer 1.

Figure 4:
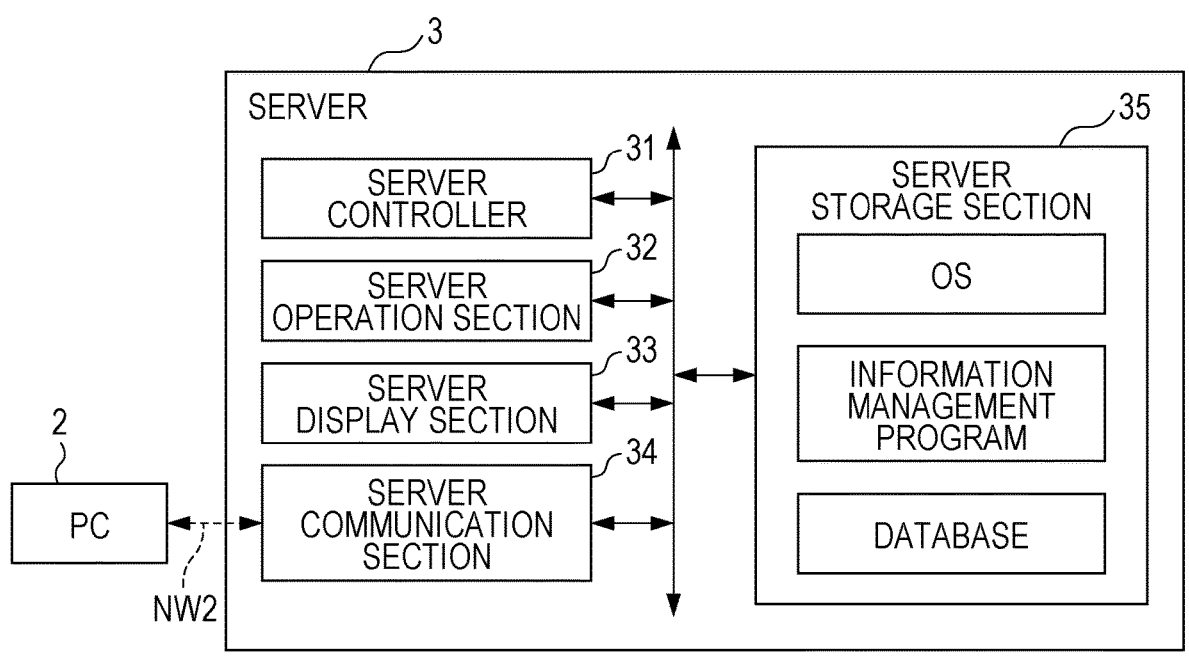
FIG. 4 is a block diagram illustrating the hardware configuration of a server.

FIG. 4 is a block diagram illustrating the hardware configuration of the server 3. The server 3 includes a server controller 31, a server operation section 32, a server display section 33, a server communication section 34, and a server storage section 35.

The server controller 31 includes a processor, such as a CPU, or the like, a ROM, a RAM, and the like, and controls each section in the server 3. The server operation section 32 is used for performing various operations by a user who operates the server 3. The server display section 33 displays various kinds of information, such as the information transmitted from the PC 2, and the like. The server communication section 34 performs communication with the PC 2 via the second network NW2.

The server storage section 35 stores the OS, an information management program, the database, and the like. The OS is basic software that executes an application program, such as an information management program, and the like. The information management program is a server program for managing information transmitted from the PC 2. The database stores the information transmitted from the PC 2. The server controller 31 performs based on the information management program, using the information stored in the database, various kinds of processing, such as creating information on the maintenance and the inspection of the printer 1, giving an instruction regarding the maintenance and the inspection to an external device, replenishing consumables and creating a delivery plan, giving the replenishment and delivery instructions of consumables, calculating the charge in accordance with the consumption amount of consumables, demanding the calculated charge, and the like.

With the above-described configuration, the PC controller 21 collects information on the items to be collected from each printer 1 connected to the PC 2 based on the information collection setting file stored in the PC storage section 27. At this time, the PC controller 21 does not collect information on all the items specified in the information collection setting file every time for each collection timing, but changes the collection frequency of information based on the change frequency of the information for each item.

More specifically, the PC controller 21 measures the change frequency of information during the measurement time. The PC controller 21 sets an expectation value of changing information based on the measurement result and determines whether or not to collect information for each collection timing using the set expectation value. In this regard, the measurement time for measuring the change frequency of information may be a time different for each information or may be time common to all pieces of the information. Also, the measurement time may be a set time or a different time for each measurement.

First, the PC controller 21 measures the change frequency of information during the measurement time and sets a first time expectation value, which is an initial value of the expectation value. The first time expectation value is calculated as a quotient when the number of times changed from the information collected last time to the information collected this time during the measurement time is divided by the number of collection times during the measurement time. For example, when the number of collection times during measurement time is 30, and the number of changed times from the information collected last time to the information collected this time is six, the first time expectation value is assumed to be 20%. At this time, the PC controller 21 sets the first time expectation value so as not to become lower than or equal to a preset minimum expectation value. The minimum expectation value is a value higher than zero. That is to say, when the first time expectation value calculated by the above-described expression becomes lower than or equal to a minimum expectation value, the PC controller 21 sets the first time expectation value to the minimum expectation value. Thereby it is possible to prevent the first time expectation value from being set to an extremely low value.

In this regard, the measurement time is time measured using as a start point, the starting time of the information collection program, the starting time of the printer 1, or the starting time of the information collection operation by a user. During the measurement time, no restriction is imposed on the information to be collected in order to set a collection frequency suitable for the use result of the printer 1. Also, the PC controller 21 stores the set first time expectation value in a current expectation value storage area not illustrated in the figure in the RAM, or the like, disposed in the PC controller 21. The current expectation value storage area is an area for storing the current expectation value, which is an expectation value currently set. At the time of setting a first time expectation value, the first time expectation value becomes the current setting value.

The PC controller 21 accumulates the expectation value for each collection timing of information after the lapse of a measurement time, that is to say, after setting a first time expectation value and collects information on the condition that the accumulated expectation value exceeds a threshold value. For example, when the first time expectation value is set to 20%, in a case in which the threshold value is 50%, the PC controller 21 collects information at the third collection timing. In this regard, the accumulation value of the expectation values accumulated for each collection timing is stored in the accumulated expectation value storage area, not illustrated in the figure, disposed in the RAM, or the like in the PC controller 21. Hereinafter the "accumulation value of expectation values" is referred to as an accumulated expectation value. In this regard, the threshold value is a value set for each item of information in the information collection setting file.

Also, after the PC controller 21 sets the first time expectation value, when the information is changed, the PC controller 21 updates the expectation value. More specifically, after the PC controller 21 sets the first time expectation value, when the collected information is changed, the PC controller 21 updates the current expectation value based on the number of collection timings from the setting of the current expectation value to the change of the information. That is to say, the PC controller 21 rewrites the current expectation value storage area in consideration of the latest expectation value. The latest expectation value is calculated as the reciprocal of "the number of collection timings of information from the time when the current expectation value is set to the time when the information is changed". In this manner, it is possible to collect information at more suitable collection intervals by updating the expectation value.

For example, when the current expectation value stored in the current expectation value storage area is 20%, and the threshold value is 50%, information is collected at a rate of one out of three among three collection timings. After the PC controller 21 sets the current expectation value, at the third collection timing, when information is changed, the latest expectation value becomes "one time/three times", namely 33%. Accordingly, the PC controller 21 calculates the average of the current expectation value of 20% and the latest expectation value of 33% and determines a new current expectation value to be 26%. On the other hand, when the information is not changed at the third collection timing, the PC controller 21 does not update the current expectation value. Also, for example, after setting the current expectation value, when the information is not changed at the third collection timing, and the information is changed at the sixth collection timing, the latest expectation value becomes "one time/six times", namely 16%. Accordingly, the PC controller 21 calculates the average of the current expectation value of 20% and the latest expectation value of 16% and determines a new current expectation value to be 18%.

In this regard, updating the current expectation value is not limited to the calculation of the average of the current expectation value stored in the current expectation value storage area and the latest expectation value. The updating may be based on a predetermined algorithm using the current expectation value stored in the current expectation value storage area and the latest expectation value as parameters.

In this regard, when the PC controller 21 collects information from a plurality of printers 1, the PC controller 21 sets and updates an expectation value for each printer 1. Also, when a plurality of items to become collection targets are set in the information collection setting file, and the PC controller 21 collects information for the plurality of items, the PC controller 21 sets and updates an expectation value for each item.

When the PC controller 21 collects information from the printer 1, the PC controller 21 temporarily stores the collected information in the information storage area, not illustrated in the figure, disposed in the RAM, or the like, in the PC controller 21. The PC controller 21 reads the information stored in the information storage area and records the information in an information collection log in the PC storage section 27 together with a collection time. Also, the PC controller 21 transmits the collected information to the server 3. In this regard, the transmission of information from the PC 2 to the server 3 may be performed every time the PC 2 stores information in the information storage area, or the information collected during the measurement time may be stored in the PC storage section 27 separately from an information collection log and may transmit the stored information after a lapse of the measurement time. Also, the collected information may be stored in the PC storage section 27, and when an information transmission request is received from the server 3 or when the PC operation section 23 has performed an information transmission operation, the stored information may be transmitted from the PC 2 to the server 3.

Figure 5:
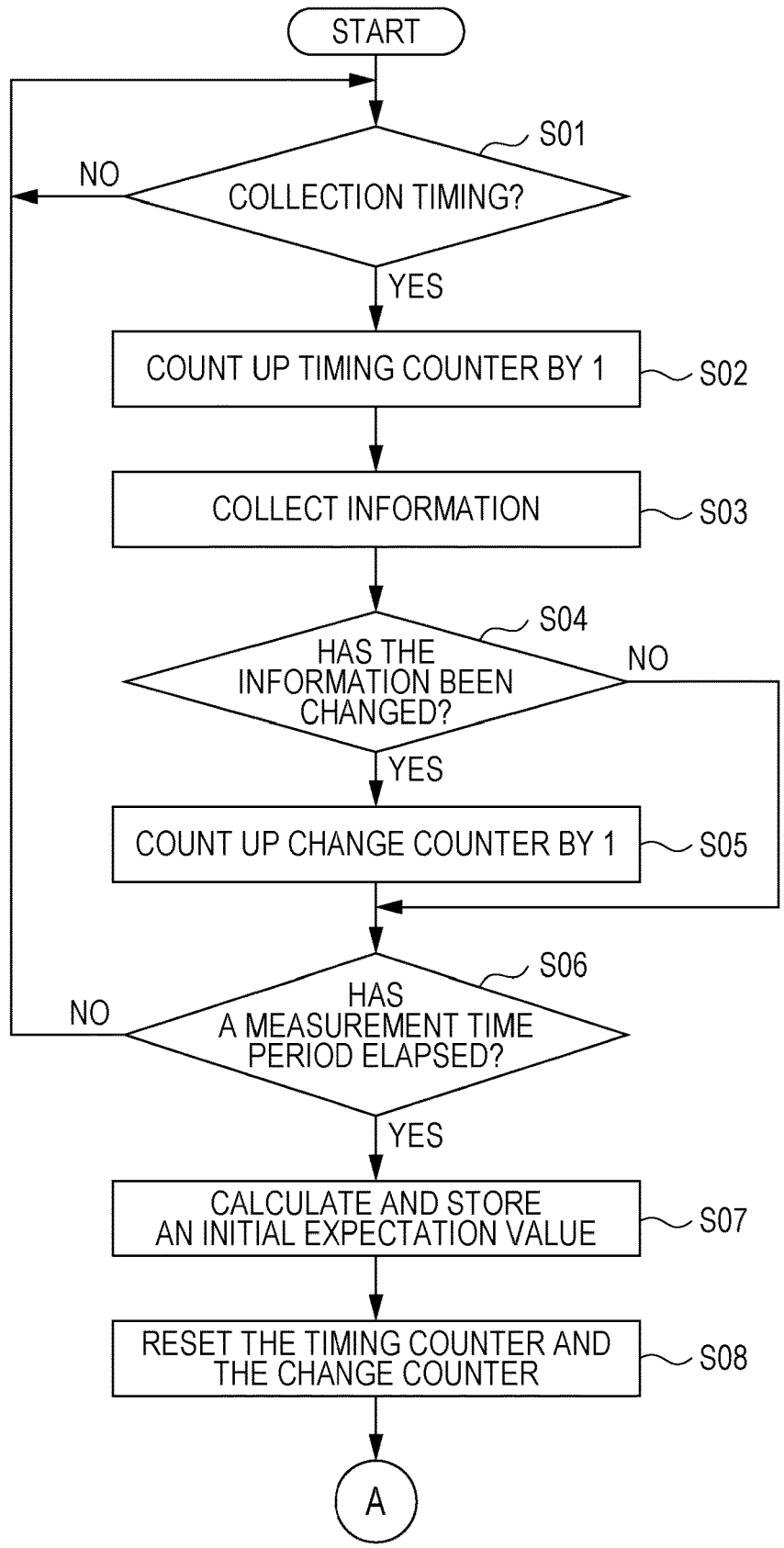
FIG. 5 is a flowchart illustrating the flow of information collection processing according to a first embodiment.
Figure 6:
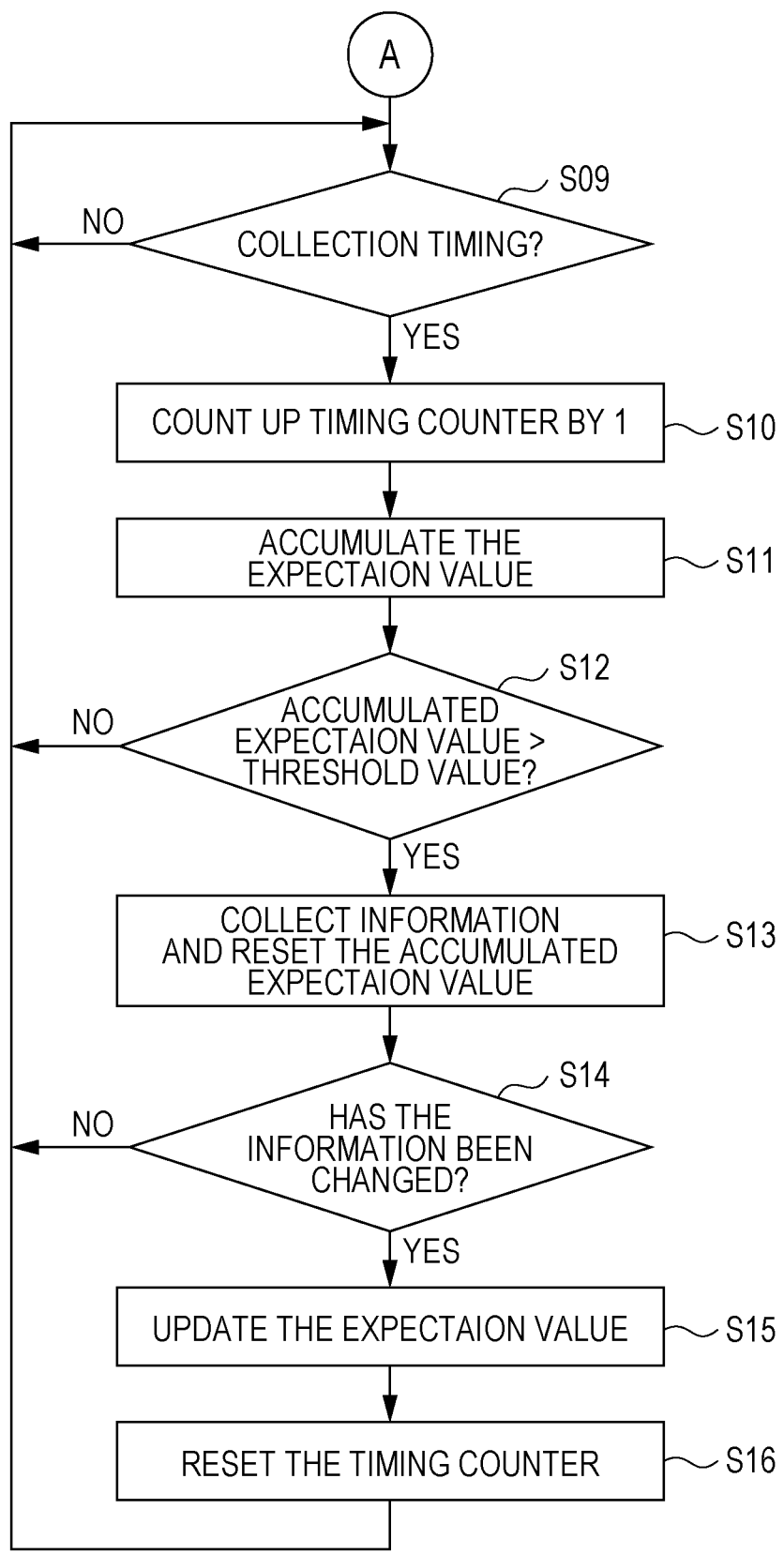
FIG. 6 is a flowchart continued from the flowchart in FIG. 5.

FIG. 5 and FIG. 6 are flowcharts illustrating the flow of the information collection processing according to the first embodiment. FIG. 5 a flowchart illustrating the processing flow until the first time expectation value is set. FIG. 6 is a flowchart illustrating the processing flow after the first time expectation value is set. The information collection processing is an example of the "method of controlling the information collection apparatus control". The PC controller 21 starts the information collection processing using a start of the information collection program, a start of the printer 1, or an information collection start operation by a user as a trigger.

The PC controller 21 determines as to whether or not it is a collection timing based on the clock of the PC clock section 22 (S01). When the PC controller 21 determines that it is not the collection timing (S01: NO), the PC controller 21 repeats the processing of S01. When the PC controller 21 determines that it is the collection timing (S01: YES), the PC controller 21 counts up the timing counter for counting the number of collection timings (S02), the PC controller 21 collects information indicating the state of the printer 1 from the printer 1 (S03). In this manner, until a first time expectation value is set, the value of the timing counter is equal to the number of collection times of information. In this regard, in S03, when a plurality of pieces of information are set in the information collection setting file, the PC 2 transmits a request command requesting each group of the information to the printer 1, and the printer 1 individually responds to the request command. In this manner, the PC 2 collects information. That is to say, each request command includes data specifying an item of the information. This is the same for the process of S13 in FIG. 6 described later. Also, although not illustrated in the figure in particular, when the PC controller 21 fails to collect information from the printer 1 in S03, the PC controller 21 records an error in the information collection log. When the PC controller 21 fails to collect information a plurality of times consecutively, the PC controller 21 notifies a user of the error.

When the PC controller 21 collects information from the printer 1, the PC controller 21 determines whether or not the information collected this time has been changed from the collected information collected last time (S04). When the PC controller 21 determines that the information has been changed (S04: YES), the PC controller 21 counts up the change counter for counting the number of times of changes (S05). In this regard, when the processing of S03 is the first information collection after starting the information collection processing, the PC controller 21 determines that the information has not been changed in S04. Also, when the PC controller 21 determines that the information has not been changed (S04: NO), the PC controller 21 omits the processing of S05. After that, the PC controller 21 determines whether or not a measurement time period has elapsed from the start of the information collection processing (S06). When the PC controller 21 determines that the measurement time period has not elapsed (S06: NO), the processing returns to S01. Also, when the PC controller 21 determines that the measurement time period has elapsed (S06: YES), the PC controller 21 calculates a first time expectation value based on the value of the timing counter and the value of the change counter and stores the calculated first time expectation value in the current expectation value storage area (S07). Also, the PC controller 21 resets the timing counter and the change counter (S08).

As illustrated in FIG. 6, After setting the first time expectation value, the PC controller 21 determines whether or not it is the collection timing (S09). When the PC controller 21 determines that it is not the collection timing (S09: NO), the PC controller 21 repeats the processing of S09. Also, when the PC controller 21 determines that it is the collection timing (S09: YES), the PC controller 21 counts up the timing counter (S10). Also, the PC controller 21 accumulates the expectation value stored in the current expectation value storage area (S11) and updates the accumulated expectation value to be stored in the accumulated expectation value storage area. The PC controller 21 determines whether or not the accumulated expectation value is higher than a preset threshold value (S12). When the accumulated expectation value is not higher than a preset threshold value (S12: NO), the processing returns to S09. Also, when the PC controller 21 determines that the accumulated expectation value is higher than the preset threshold value (S12: YES), the PC controller 21 collects information from the printer 1 and resets the accumulated expectation value (S13).

After that, the PC controller 21 determines whether or not the information collected this time has been changed from the information collected last time (S14). When the PC controller 21 determines that the information has been changed (S14: YES), the PC controller 21 updates the expectation value based on the current expectation value stored in the current expectation value storage area and the latest expectation value (S15). Also, the PC controller 21 resets the timing counter (S16), and the processing returns to S09. Also, when the PC controller 21 determines that the information has not been changed (S14: NO), the processing returns to S09 without updating the expectation value. In this regard, the processing of each step illustrated in FIG. 6 is repeatedly executed until when the information collection program is ended, when the power to the printer 1 is turned off, or when a user performs end operation of the information collection.

As described above, with the first embodiment, the PC 2 that collects information indicating the state of the printer 1 sets a first time expectation value based on the change frequency of the information. After setting the first time expectation value, the PC 2 collects information on the condition that the accumulated value of the expectation value for each collection timing of the information exceeds a threshold value. Accordingly, it is possible to collect information at collection intervals suitable for the change frequency of the information. Thereby, compared with the case of collecting information every time at collection timing, it is possible to reduce the collection frequency of information, thus to reduce the congestion of the first network NW1 connecting the PC 2 and the printer 1, and to reduce the power consumption of the PC 2.

Also, the PC 2 sets the first time expectation value such that the first time expectation value is higher than a preset minimum expectation value. Accordingly, when the change frequency of information is low, it is possible to prevent the collection frequency of information from becoming too low. Also, after setting the first time expectation value, when the collected information is changed, the PC 2 updates the expectation value. Accordingly, it is possible for the PC 2 to collect information at suitable collection intervals even when the change frequency of information is changed.

Also, when the PC 2 collects information for a plurality of items, the PC 2 sets an expectation value for each item and collects information based on the expectation value for each item. Accordingly, it is possible for the PC 2 to collect information at collection intervals suitable for the change frequency of the information for each item. Also, when the PC 2 collects information on a plurality of printers 1, the PC 2 sets an expectation value for each printer 1 and collects information based on the expectation value set for each printer 1. Accordingly, it is possible for the PC 2 to collect information at collection intervals suitable for the change frequency of the information of each printer 1. Further, the PC 2 transmits the information collected from the printer 1 to the server 3 that manages the information, and thus it is possible for the server 3 to use the information effectively.

In this regard, it is possible to make the following variations from the first embodiment.

Variation 1-1

In the first embodiment, a threshold value that becomes a determination criterion as to whether or not to collect information is a value set for each item in the information collection setting file. However, the value may be a value common to all the items. Also, the information collection setting file may be set for each printer 1.

Variation 1-2

In the first embodiment, the PC 2 sets a measurement time at the time of starting the information collection processing and sets a first time expectation value. However, the PC 2 may not set the first time expectation value. In this case, the PC 2 may collect information for each collection timing using the preset first time expectation value and update the expectation value. Also, the first time expectation value may be a value set for each item in the information collection setting file or a value set for each printer 1.

Second Embodiment

A description will be given of a second embodiment. In the second embodiment, information to be collected is narrowed down in consideration of relationships among the pieces of information. In the following, a description will be given mainly of the points different from those of the first embodiment. In this regard, in the present embodiment, the same component as that in the first embodiment is given the same sign, and the detailed description thereof will be omitted. Also, the variations applied to the same components as those in the first embodiment are also applied to the present embodiment in the same manner. In this regard, it is assumed that the printer 1 according to the present embodiment is an ink jet printer that uses copy paper as a print medium and is capable of double-side printing.

The system configuration in the present embodiment and the hardware configurations of the printer 1, the PC 2 and the server 3 are substantially the same as those in the first embodiment. However, in the present embodiment, a collection condition table T is stored as an information collection setting file stored in the PC storage section 27.

FIG. 7 is a diagram illustrating an example of a collection condition table T. The collection condition table T is a table associating a first group of information, a first condition, a second group of information, a second condition, and a third group of information. Here, the first condition is a collection condition for the second group of information, and the second condition is a collection condition for the third information. Also, the first group of information is information to be collected first in a communication session that collects information. Also, the second group of information is information having a possibility of being changed when the first group of information satisfies the first condition. The third group of information is information having a possibility of being changed when the second group of information satisfies the second condition.

The PC controller 21 collects the first group of information and then refers to the collection condition table T. When the collected first group of information satisfies the associated first condition, the PC controller 21 determines to collect the associated second group of information. When the collected first group of information does not satisfy the associated first condition, the PC controller 21 determines not to collect the associated second group of information. Also, the PC controller 21 collects the second group of information and then refers to the collection condition table T. When the collected second group of information satisfies the associated second condition, the PC controller 21 determines to collect the associated third group of information. When the collected second group of information does not satisfy the associated second condition, the PC controller 21 determines not to collect the associated third group of information. In this regard, when the first information is not associated with the first condition, the second group of information is not collected. Also, when the second group of information is not associated with the second condition, the third group of information is not collected.

For example, as illustrated in FIG. 7, when the PC controller 21 collects information on an item "cartridge serial number" as the first information, the PC controller 21 determines whether or not the collected information satisfies "change", which is the first condition. Here, "change" refers to that the collected first information has been changed from the first group of information collected last time.

When the information on the "cartridge serial number" satisfies the first condition, that is to say, when the cartridge serial number collected this time has been changed from the cartridge serial number collected last time, the PC controller 21 collects, as the second group of information, information on the items "number of replacement times of cartridge" and "cartridge serial number". Here, the "number of replacement times of cartridge" is the sum value of the number of replacement times of cartridge recorded in the printer 1. The sum value may be recorded for each color or may be recorded for the cartridges of all the colors regardless of color. Also, when it is possible to reset the sum value in the printer 1, the sum value is the accumulated value from the time of resetting last time to the time of collecting the information, whereas when it is not possible to reset the sum value, the sum value is the accumulated value from the time of factory shipment to the time of collecting the information.

Also, when the information on the "cartridge model number" satisfies "change", which is the second condition, the PC controller 21 collects information on the items "cartridge color information" and "cartridge capacity" as a third group of information. Here, the "cartridge color information" refers to the color of ink contained in the ink cartridge, and the "cartridge capacity" refers to the ink storage amount of an ink cartridge in an unused state. In this regard, for the information on the item "number of replacement times of cartridge", which is one of the second group of information, a second condition is not associated, and thus a determination as to whether or not the second condition is satisfied is not performed.

In this manner, the reason why the information on the item "cartridge serial number" is collected as the first group of information is that the information is used by the server 3 for creating plans for replenishment and delivery of consumables and giving instructions to replenish and deliver the consumables. Also, the "cartridge serial number" is unique information assigned to the ink cartridge and is not changed unless the ink cartridge is replaced. Also, the reason why the information on the items "number of replacement times of cartridge" and "cartridge model number" are collected as the second group of information is that there is a high possibility that the information on the item "number of replacement times of cartridge" and the information "cartridge model number" is changed with a change of the "cartridge serial number". Also, the reason why the information on the items "cartridge color information" and "cartridge capacity" are collected as the third group of information is that the color information and the capacity are determined for each "cartridge model number", and thus there is a high possibility that information on the items "cartridge color information" and "cartridge capacity" are changed with a change in the "cartridge model number".

On the other hand, when the PC controller 21 collects information on the item "ink remaining amount" as the first information, the PC controller 21 determines whether or not the collected information satisfies "increase", which is the first condition. Here, "increase" refers to that the collected first information value has increased from the first information value collected last time. When the collected first group of information satisfies the first condition, the PC controller 21 collects the second group of information in the same manner as the case in which the PC controller 21 collects the information on the item "cartridge serial number". For the second condition and the third group of information, the descriptions are the same as those in the case in which the first information is "cartridge serial number".

In this manner, the reason why information on the item "ink remaining amount" is collected as the first information is that the item "ink remaining amount" is the information used when a charge is calculated in accordance with the ink used amount in the server 3. Also, when the "ink remaining amount" has been on the "increase", the reason why the items "number of replacement times of cartridge" and "cartridge model number" are collected as the second group of information is that when the "ink remaining amount" has been increased, there is a high possibility that the ink cartridge has been replaced. In this regard, the first condition associated with the information on the item "ink remaining amount" may be "change", which is a superordinate concept of "increase".

Also, when the PC controller 21 collects information on the item "elapsed time after start" as the first information, the PC controller 21 determines whether or not the collected information satisfies the first condition "the elapsed time after start is shorter than the elapsed time from the last information collection time". This is in order to determine whether or not the printer 1 has been started after the first information was collected last time. When the collected first information satisfies the first condition, the PC controller 21 collects the information on the items "the number of paper cassettes" and "existence of double-side printing unit" as the second group of information. Here, "the number of paper cassettes" refers to the number of paper cassettes, which are parts that supply copy paper, namely a print medium, to the printer engine 14, mounted on the printer 1. Also, "existence of double-side printing unit" refers to whether or not a double-side printing unit, which is a part for printing on both sides of copy paper, is mounted on the printer 1. In this regard, the information on the items "the number of paper cassettes" and "existence of double-side printing unit" is not associated with a second condition, and thus a determination is not made on whether or not the second group of information satisfies the second condition.

In this manner, the reason why the information on the items "the number of paper cassettes" and "existence of double-side printing unit" are collected as subordinate information of the item "elapsed time after start" is that parts, such as a paper cassette, a double-side printing unit, and the like are replaced in a state in which the power to the printer 1 is turned off, that is to say, it is assumed that the parts are not changed in a power-on state.

In this regard, out of the information illustrated in FIG. 7, the information on the items "cartridge serial number", "the number of times of cartridge replacement", "cartridge model number", "cartridge color information", "cartridge capacity", "ink remaining amount" are included in colorant information. Also, the information on the item "the number of paper cassettes" is included in print medium information. The colorant information and the print medium information are examples of "information on consumables used by the printer". On the other hand, information on the item "the number of paper cassettes" is an example of "information on a device configuration of the printer".

Figure 8:
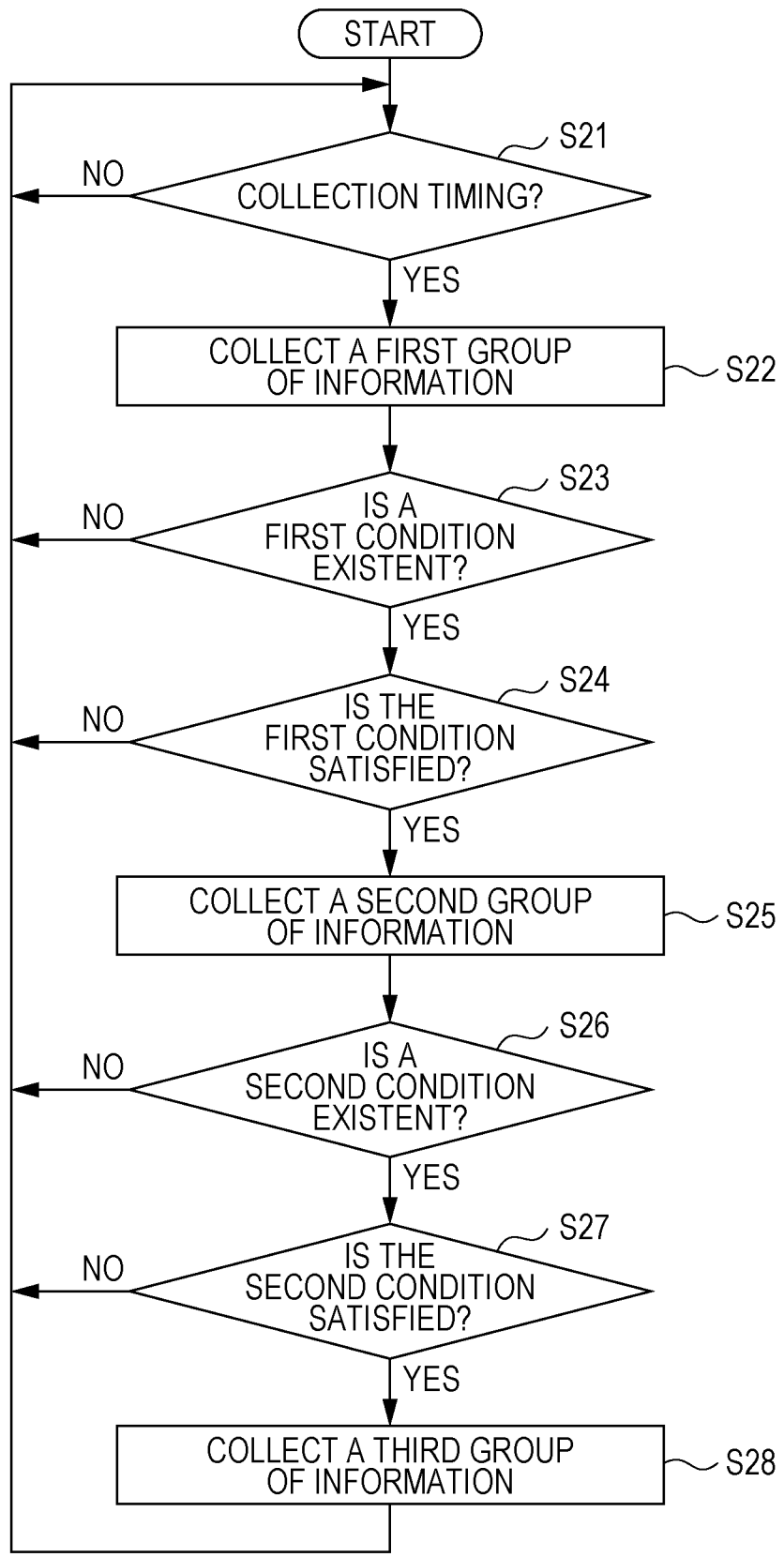
FIG. 8 is a flowchart illustrating the flow of information collection processing according to the second embodiment.

FIG. 8 is a flowchart illustrates the information collection processing according to the second embodiment. The information collection processing is an example of the "method of controlling an information collection apparatus". The PC controller 21 starts the information collection processing using the start of the information collection program, the start of the printer 1, or an information collection start operation by a user as a trigger. In this regard, the processing of the flowchart is performed for each first group of information.

The PC controller 21 determines whether or not it is a collection timing based on time kept by the PC clock section 22 (S21). When the PC controller 21 determines that it is not a collection timing (S21: NO), the processing returns to S21, whereas the PC controller 21 determines that it is a collection timing (S21: YES), the PC controller 21 refers to the collection condition table T and collects the first group of information from the printer 1 (S22).

In S22, when a plurality of first groups of information are set in the collection condition table T, the PC 2 transmits request commands that request transmission of individual groups of information from the printer 1. The printer 1 replies the respective request commands for the PC 2 to collect information. That is to say, the individual request commands include data specifying an item of the first group of information. Also, although not illustrated in the figure in particular, when the PC controller 21 fails to collect information from the printer 1 in S22, the PC controller 21 records an error in the information collection log. When the PC controller 21 fails to collect information a plurality of times consecutively, the PC controller 21 notifies the user of an error. Also, when the PC controller 21 successfully collects information in S22, the PC controller 21 stores the collected information in the RAM in the PC controller 21 and records the collected information in the information collection log in the PC storage section 27. The details of collecting the information in S22 are the same as the processing of steps S25 and S28 described later.

When the PC controller 21 collects a first group of information, the PC controller 21 refers to the collection condition table T and determines whether or not the collected first group of information is associated with the first condition (S23). When the PC controller 21 determines that the collected first group of information is associated with a first condition (S23: YES), the PC controller 21 determines whether or not the collected first group of information satisfies the first condition (S24). When the PC controller 21 determines that the collected first group of information is not associated with the first condition (S23: NO), and when the PC controller 21 determines that the collected first group of information does not satisfy the first condition (S24: NO), the processing returns to S21. Also, when the PC controller 21 determines that the collected first group of information satisfies the first condition (S24: YES), the PC controller 21 refers to the collection condition table T and collects a second group of information associated with the first group of information from the printer 1 (S25).

When the PC controller 21 collects the second group of information, the PC controller 21 refers to the collection condition table T and determines whether or not the collected second group of information is associated with a second condition (S26). When the PC controller 21 determines that the collected second group of information is associated with a second condition (S26: YES), the PC controller 21 determines whether or not the collected second group of information satisfies the second condition (S27). When the PC controller 21 determines that the collected second group of information is not associated with a second condition (S26: NO), and the collected second group of information does not satisfies the second condition (S27: NO), the processing returns to S21. Also, when the PC controller 21 determines that the collected second group of information satisfies the second condition (S27: YES), the PC controller 21 refers to the collection condition table T and collects a third group of information associated with the second group of information from the printer 1 (S28). In the collection condition table T according to the present embodiment, the subordinate information of the first group of information is only the second group of information and the third group of information. Accordingly, when the PC controller 21 collects the third group of information (S28), the processing returns to S21.

As described above, with the second embodiment, the PC 2 collects a first group of information from the printer 1 and only when the collected group of information satisfies the associated first condition, the PC 2 determines to collect the associated second group of information. Accordingly, compared with the first group of information, it is possible to reduce the collection frequency of the second group of information. That is to say, compared with the case of collecting the second group of information with the same frequency as that of the first information, it is possible to reduce the number of information collection times in one communication session. Thereby, it is possible to reduce the congestion of the first network NW1 that connects the PC 2 and the printer 1, and to reduce the power consumption of the PC 2.

In the same manner, the PC 2 collects the second group of information from the printer 1 and only when the collected second group of information satisfies the associated second condition, the PC 2 determines to collect the associated third group of information. Accordingly, compared with the second group of information, it is possible to further reduce the collection frequency of the third group of information. Thereby, it is possible to further reduce the congestion of the first network NW1 that connects the PC 2 and the printer 1, and to further reduce the power consumption of the PC 2. Also, the PC 2 transmits the information collected from the printer 1 to the server 3 that manages the information, and thus it is possible for the server 3 to effectively use the information.

In this regard, it is possible to make the following variations from the second embodiment.

Variation 2-1

In the second embodiment, as the condition to be set in the collection condition table T, "change", "increase", and the like are illustrated. However, it is possible to set conditions other than these. For example, when the collected information indicates a certain phenomenon, subordinate information may be collected. Also, whether or not to collect subordinate information may be determined based on the result of a comparison between the collected information and a specified value. For example, subordinate information may be collected when the collected information has the same value as a specified value, when the collected information has a value different from a specified value, when the collected information has a value higher than a specified value, when the collected information has a value lower than a specified value, when the collected information has a value within a specified range, or the collected information has a value outside a specified range. In this regard, "larger" and "smaller" may be replaced by "equal to or higher" and "less than or equal to". Also, whether or not to collect subordinate information may be determined based on the result of a comparison between the collected information and another piece of information. For example, subordinate information may be collected when the collected information has the same value as another piece of information, when the collected information has a value different from another piece of information, the collected information has a value higher than that of another piece of information, the collected information has a value lower than that of another piece of information, when the collected information has a value within a range based on another piece of information, or the collected information has a value outside the range based on another piece of information. In this regard, "another piece of information" may be the collected information on the same item as that of the information collected in the past or information on another item from the information collected in the past. Also, various kinds of information managed by the PC 2 may be used for "another piece of information" in addition to the information collected from the printer 1. For example, when the PC 2 collects information from a plurality of printers 1, the information to be used may be information collected from a printer 1 other than the printers 1 whose information is collected. Also, "another piece of information" may be the current time managed by the PC 2. Also, whether or not to collect subordinate information may be determined based on a calculation result of an expression using the collected information as a parameter. For example, subordinate information may be collected when the calculation result of an expression is "true", or when the calculation result of an expression is "false".

Variation 2-2

In the second embodiment, the information associated with the first group of information in the collection condition table T is only the second group of information and the third group of information. However, a further subordinate information than the third group of information may be set. Also, in the collection condition table T, it is not necessary to set a first condition, and only a first group of information may be set. Also, the collection condition table T may be displayed on the PC display section 24 and may be editable by the operation in the PC operation section 23.

In this regard, it is possible to make the following variations from the first embodiment and the second embodiment.

Variation 3-1

Figure 9:
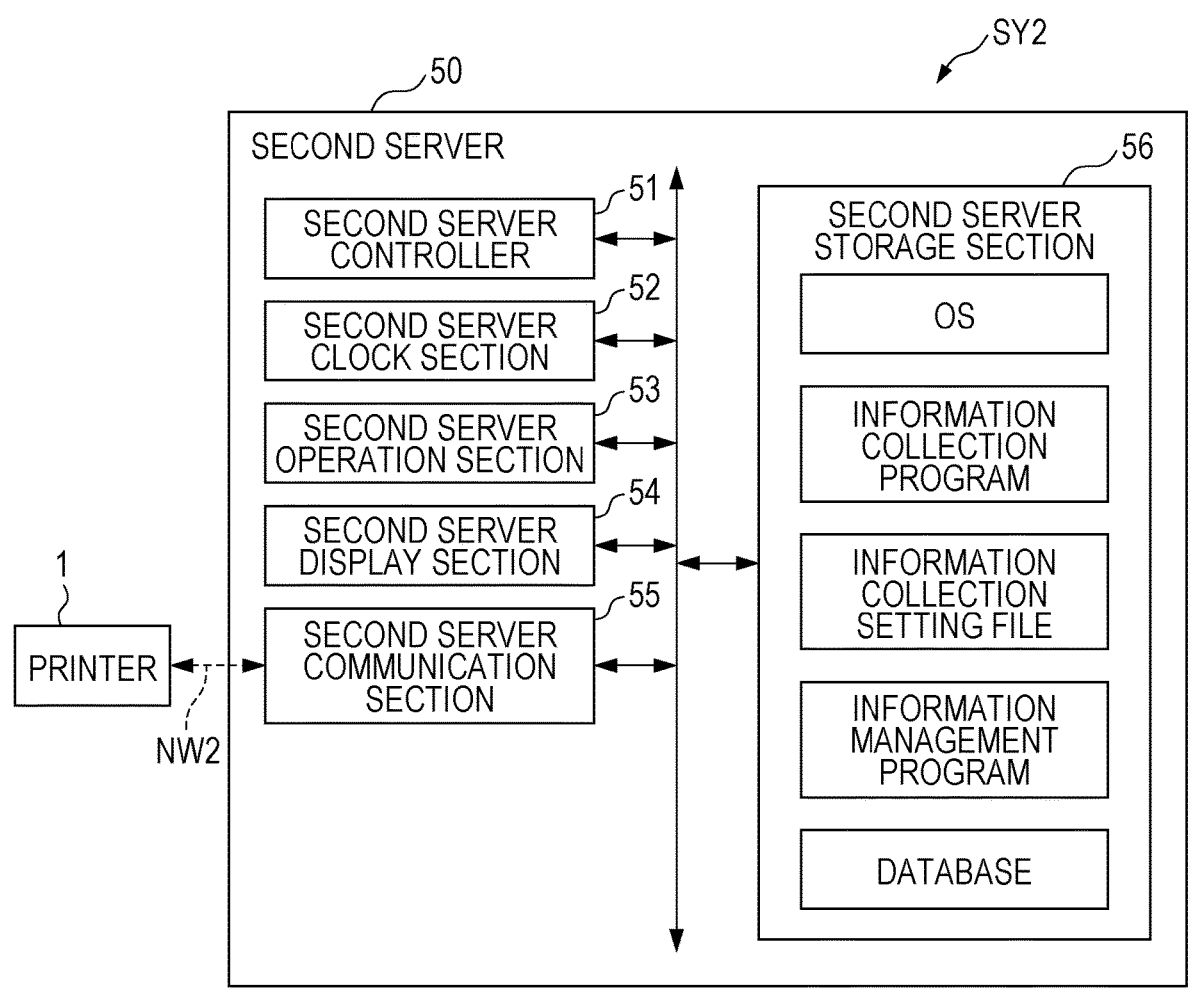
FIG. 9 is a block diagram of an information collection system according to a variation 3-1.

In each embodiment described above, the PC 2 collects information. However, the server may collect information. FIG. 9 is a block diagram of an information collection system SY2 according to a variation 3-1. The information collection system SY2 includes one or more printers 1 and a second server 50. The second server 50 is an example of the "information collection apparatus". Also, the printer 1 and the second server 50 are connected via a second network NW2, such as the Internet communication network, and the like.

The second server 50 includes a second server controller 51, a second server clock section 52, a second server operation section 53, a second server display section 54, a second server communication section 55, and a second server storage section 56. In this regard, the second server controller 51 is an example of the "controller". The second server controller 51, the second server clock section 52, the second server operation section 53, and the second server display section 54 function in the same manner as the PC controller 21, the PC clock section 22, the PC operation section 23, and the PC display section 24 respectively in the above-described embodiments (refer to FIG. 3). Also, the second server communication section 55 communicates with the printer 1 via the second network NW2.

The second server storage section 56 stores an information management program stored in the server storage section 35 in addition to each piece of information stored in the PC storage section 27 (refer to FIG. 3). That is to say, the second server 50 performs management of the collected information based on the information management program in addition to collection of information based on the information collection program.

In this manner, with the configuration according to the variation 3-1, it is possible to simplify the system configuration of the information collection system SY2 without using a PC. In this regard, as another variation of the variation 3-1, the second server 50 may perform only the collection of information and another server may perform the management of the information.

Variation 3-2

Figure 10:
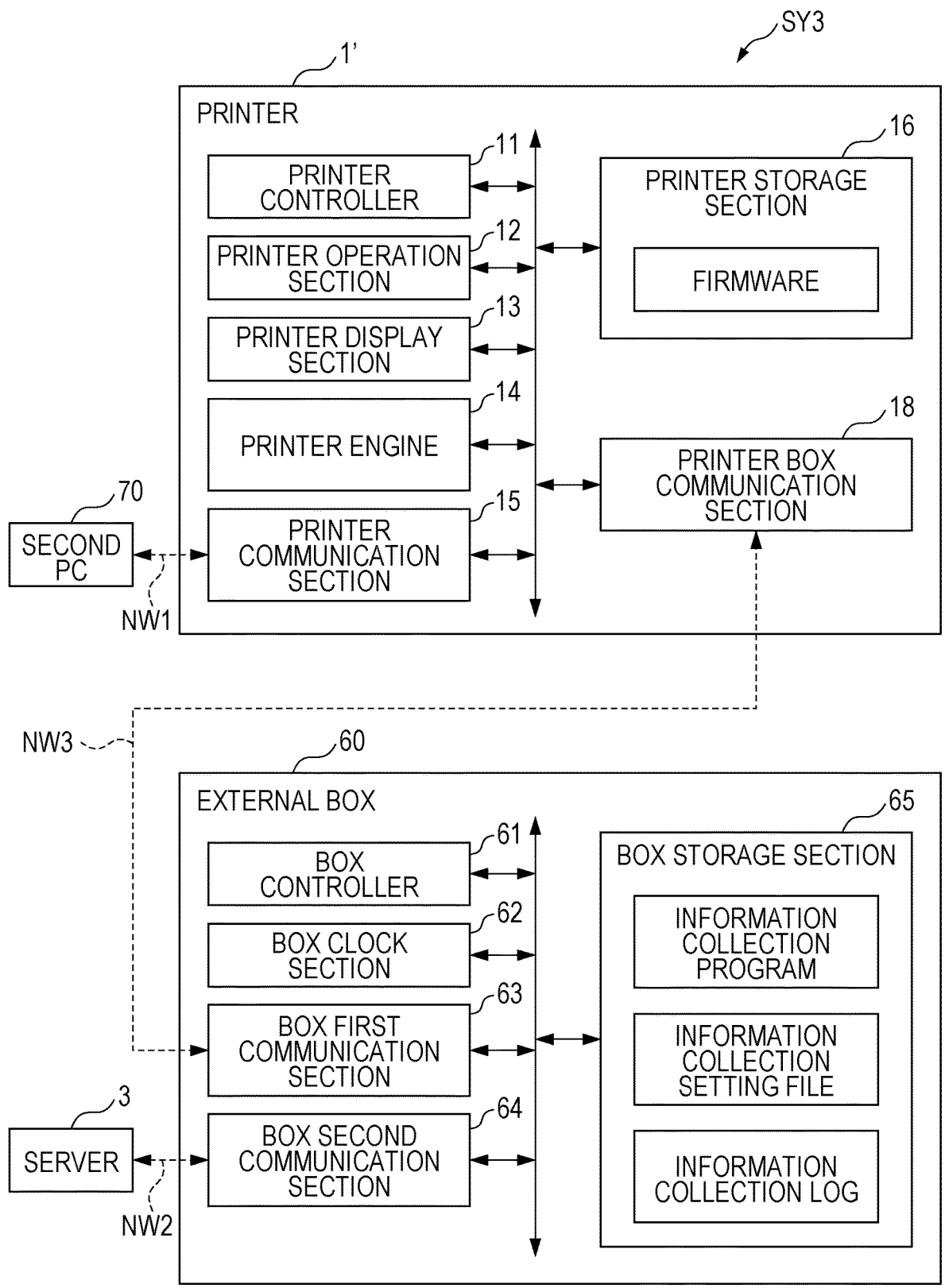
FIG. 10 is a block diagram of an information collection system according to a variation 3-2.

An external box 60 attachable to the printer 1 may be used to collect information. FIG. 10 is a block diagram of an information collection system SY3 according to a variation 3-2. The information collection system SY3 includes a printer 1', an external box 60, a second PC 70, and a server 3. The external box 60 is an example of the "information collection apparatus". The printer 1' and the second PC 70 are connected via a first network NW1, such as a LAN, or the like. Also, the external box 60 and the server 3 are connected via a second network NW2, such as the Internet communication network, or the like. Also, the printer 1' and the external box 60 are connected via a third network NW3, such as a communication network by an infrared communication, Bluetooth (registered trademark) communication, or the like. In this regard, the printer 1' and the external box 60 may be connected by a dedicated line so as to have a one-to-one relationship.

The printer 1' has a configuration in which a printer box communication section 18 is added to the configuration of the printer 1 illustrated in FIG. 2. The printer box communication section 18 communicates with the printer 1' via the third network NW3. Also, the printer communication section 15 according to the variation 3-2 receives print data from the second PC 70. In this regard, it is possible for the second PC 70 to use the configuration of a general PC, and thus the description thereof will be omitted.

The external box 60 includes a box controller 61, a box clock section 62, a box first communication section 63, a box second communication section 64, and a box storage section 65. In this regard, the box controller 61 is an example of the "controller". The box controller 61 and the box clock section 62 function in the same manner as the PC controller 21 and the PC clock section 22 in the first embodiment and the second embodiment respectively (refer to FIG. 3). The box first communication section 63 communicates with the printer 1' via the third network NW3. Also, the box second communication section 64 communicates with the server 3 via the second network NW2.

The box storage section 65 stores information other than the OS among each information stored in the PC storage section 27 (refer to FIG. 3). That is to say, in the information collection program according to the present variation is assumed to be a program that does not necessitate an OS, but may be a processing that runs on an OS.

In this manner, with the configuration according to the variation 3-2, by attaching the external box 60 to the printer 1', it is possible to have the same effects as those of each embodiment described above. In this regard, as a further variation of the variation 3-2, the external box 60 may be incorporated in the printer. Also, as a further variation, the external box 60 may not be disposed for each printer 1', but one external box 60 may collect information of a plurality of printers 1'.

Variation 3-3

In each embodiment described above, the PC 2 collects information at certain time intervals. However, the time intervals for collecting information may be varied for each item or for each printer 1. That is to say, the collection timing of information may be different for each information.

Variation 3-4

The above-described first embodiment and second embodiment may be combined. For example, as in the first embodiment, an expectation value is accumulated for each collection timing of information, and information is collected on the condition that the accumulated expectation value of the expectation values exceeds a threshold value. Also, the collected information is used as the first group of information in the collection condition table T according to the second embodiment, a determination may be made as to whether or not the collected information satisfies the first condition, and a determination may be made as to whether or not subordinate information is collected in accordance with a determination result thereof.

Variation 3-5

The scope of the present disclosure includes a method of executing each processing of the PC 2, the second server 50, and the external box 60 illustrated in the above-described each embodiment and individual variations, a program for executing each processing of the PC 2, the second server 50, and the external box 60, and a computer-readable recording medium recording the program. Also, individual variations of each embodiment may be combined.

Variation 3-6

In each embodiment described above, the description has been given of information collection by the printer 1 or the printer 1'. However, when information on various electronic devices other than a printer is collected, the above-described each embodiment and individual variations may be applied. Also, instead of the PC 2, various information processing terminals, such as various tablet terminals, smartphones, and the like may be used. In addition, it is possible to make changes without departing from the spirit and scope of the disclosure, for example, to realize each processing of the PC 2, the second server 50 and the external box 60 by using the combination of hardware and software, and the like.

Appendix

In the following, an appendix is given to an information collection apparatus, a method of controlling an information collection apparatus, and a program. A PC 2 is a PC 2 for collecting information indicating a state of a printer 1, the PC 2 including: a PC controller 21 configured to collect a first group of the information and refer to a collection condition table T associating the first group of information, a first condition, and a second group of information, wherein when the collects first group of the information satisfies the associated first condition, the PC controller 21 determines to collect the associated second group of information, whereas when the collected first group of the information does not satisfy the associated first condition, the PC controller 21 determines not to collect the associated second group of information.

A method of controlling a PC 2 for collecting information indicating a state of a printer 1, the method including: collecting a first group of the information; and referring to a collection condition table T associating the first group of the information, a first condition, a second group of information, wherein when the collected first group of the information satisfies the associated first condition, determining to collect the associated second group of the information, whereas when the collected first group of the information does not satisfy the associated first condition, determining not to collect the associated second group of the information.

An information collection program that causes a PC controller 21 of a PC 2 for collecting information indicating a state of a printer 1, the processing including: collecting a first group of the information; and referring to a collection condition table T associating the first group of the information, a first condition, a second group of information, wherein when the collected first group of the information satisfies the associated first condition, determining to collect the associated second group of the information, whereas when the collected first group of the information does not satisfy the associated first condition, determining not to collect the associated second group of the information.

With this configuration, only when the first group of the information satisfies the associated first condition, a determination is made to collect the associated second group of information. Accordingly, it is possible to reduce the collection frequency of the second group of information. Thereby, it is possible to reduce the congestion of the first network NW1 that connects the PC 2 and the printer 1 and to reduce the power consumption of the PC 2.

In the PC 2 described above, the first condition is that the collected first information has been changed from the first group of information collected last time.

With this configuration, when the first group of the information is changed, it is possible to collect the second group of information.

In the PC 2 described above, the second group of information is the information on the consumables used by the printer 1 or the information on the device configuration of the printer 1.

With this configuration, when the first group of the information satisfies the associated first condition, it is possible to collect the information on the consumables used by the printer 1 or the information on the device configuration of the printer 1.

In the PC 2 described above, the first group of the information is at least one of a serial number of a colorant used by the printer 1 and the remaining amount of the colorant. The second group of information is at least one of the sum value of the number of replacement times of the colorant, which is recorded in the printer 1, and the model number of the colorant.

With this configuration, at least one of the serial number of the colorant used by the printer 1 and the remaining amount of the colorant is changed, it is possible to collect at least one of the accumulated value of the number of replacement times of the colorant, which is recorded in the printer 1, and the model number of the colorant.

In the PC 2 described above, the first group of the information is the elapsed time from starting the printer 1, and the first condition is that the elapsed time from starting the printer 1 is shorter than the elapsed time from collecting the first group of the information last time.

With this configuration, when the printer 1 is started after the first group of the information is collected last time, it is possible to collect the second group of information.

In the PC 2 described above, in the collection condition table T, a first group of the information, a first condition, a second group of the information, a second condition, and a third group of information are associated. When the PC controller 21 determines to collect the second group of the information, the PC controller 21 collects the second group of information, and when the collected second group of information satisfies the associated second condition, the PC controller 21 determines to collect the associated third group of information, whereas when the collected second group of information does not satisfy the associated second condition, the PC controller 21 determines not to collect the associated third group of information.

With this configuration, the PC controller 21 determines as to whether or not it is necessary to collect the associated third group of information in accordance with whether or not the second group of information satisfies the associated second condition. Accordingly, it is possible to reduce the collection frequency of the third group of information. Thereby, it is possible to further reduce the congestion of the first network NW1 connecting the PC 2 and the printer 1 and to further suppress the power consumption of the PC 2.

In the PC 2 described above, the PC controller 21 transmits the information collected from the printer 1 to the server 3 that manages the information.

With this configuration, it is possible for the server 3 to manage the information collected from the printer 1 and effectively use the information.

What is claimed is:

1. An information collection apparatus for collecting information indicating a state of a printer, the information collection apparatus comprising:
    a controller configured to collect a first group of the information and refer to a collection condition table associating the first group of the information, a first condition, and a second group of the information, wherein
    when the collected first group of the information satisfies the associated first condition, the controller determines to collect the associated second group of the information, whereas when the collected first group of the information does not satisfy the associated first condition, the controller determines not to collect the associated second group of the information, and
    the first group of the information comprises an elapsed time from starting the printer, and the first condition is that the elapsed time from starting the printer is shorter than an elapsed time from collecting the first group of the information at a last time.

2. The information collection apparatus according to claim 1, wherein
    the first condition comprises that the collected first group of the information has been changed from the collected first group of the information at the last time.

3. The information collection apparatus according to claim 1, wherein
    the second group of the information is information on consumables used by the printer or information on a device configuration of the printer.

4. The information collection apparatus according to claim 2, wherein
    the first group of the information is at least one of a serial number of a colorant used by the printer and a remaining amount of the colorant, and
    the second group of the information is at least one of a sum value of number of replacement times of the colorant recorded in the printer and a model number of the colorant.

5. The information collection apparatus according to claim 1, wherein
    the collection condition table includes the first group of the information, the first condition, the second group of the information, the second condition, a third group of the information in association with one another, and
    when the controller determines to collect the second group of the information, the controller collects the second group of the information, in a case in which the collected second group of the information satisfies the associated second condition, the controller determines to collect the associated third group of the information, whereas in a case in which the collected second group of the information does not satisfy the associated second condition, the controller determines not to collect the associated third group of the information.

6. The information collection apparatus according to claim 1, wherein
    the controller transmits the information collected by the printer to a server managing the information.

7. A method of controlling an information collection apparatus for collecting information indicating a state of a printer, the method comprising:
    collecting a first group of the information; and
    referring to a collection condition table associating the first group of the information, a first condition, and a second group of the information, wherein
    when the collected first group of the information satisfies the associated first condition, determining to collect the associated second group of the information, whereas when the collected first group of the information does not satisfy the associated first condition, determining not to collect the associated second group of the information, and
    the first group of the information comprises an elapsed time from starting the printer, and the first condition is that the elapsed time from starting the printer is shorter than an elapsed time from collecting the first group of the information at a last time.

8. A non-transitory recording medium recording a program that causes a controller of an information collection apparatus for collecting information indicating a state of a printer to perform processing, the processing comprising:
    collecting a first group of the information; and
    referring to a collection condition table associating the first group of the information, a first condition, and a second group of the information, wherein
    when the collected first group of the information satisfies the associated first condition, determining to collect the associated second group of the information, whereas when the collected first group of the information does not satisfy the associated first condition, determining not to collect the associated second group of the information, and
    the first group of the information comprises an elapsed time from starting the printer, and the first condition is that the elapsed time from starting the printer is shorter than an elapsed time from collecting the first group of the information at a last time.

\* \* \* \* \*